United States Patent [19]
Carter

[11] Patent Number: 5,148,012
[45] Date of Patent: Sep. 15, 1992

[54] SOLAR TRACKING DEVICE HAVING THREE SENSORS SEPARATED BY FOUR SEMICIRCULAR VANES

[75] Inventor: James R. Carter, Belmont, Miss.

[73] Assignee: C & A Technology, Belmont, Miss.

[21] Appl. No.: 776,577

[22] Filed: Oct. 15, 1991

[51] Int. Cl.⁵ .............................................. G01J 1/20
[52] U.S. Cl. ............................. 250/203 H; 356/141; 126/425
[58] Field of Search ................... 250/203 H; 356/141, 356/152; 126/425

[56] References Cited

U.S. PATENT DOCUMENTS

| | | |
|---|---|---|
| 3,421,004 | 1/1969 | Cashion . |
| 4,031,385 | 6/1977 | Zerlaut . |
| 4,098,264 | 7/1978 | Brokaw . |
| 4,107,521 | 8/1978 | Winders . |
| 4,146,785 | 3/1979 | Neale . |
| 4,147,154 | 4/1979 | Lewandowski . |
| 4,179,612 | 12/1979 | Smith . |
| 4,205,659 | 6/1980 | Beam . |
| 4,285,330 | 8/1981 | Shook . |
| 4,320,288 | 3/1982 | Schlarlack . |
| 4,349,733 | 9/1982 | Beam . |
| 4,950,063 | 8/1990 | Pohle et al. ............. 356/141 |
| 5,079,414 | 1/1992 | Martin .................. 356/141 |

Primary Examiner—David C. Nelms
Assistant Examiner—Que T. Le
Attorney, Agent, or Firm—Phelps Dunbar

[57] ABSTRACT

The solar tracking device disclosed herein is for use on a solar energy collection apparatus and facilitates optimal performance by insuring that the collection apparatus is continuously aligned with the source of the greatest amount of solar flux. The device consists of three photoelectric sensors and a plurality of vanes, each of the photoelectric sensors being connected to a circuit which controls one of three small DC motors, with each DC motor being the controlling means to either increase, decrease, or maintain the speed of the main drive motor which rotates the solar energy collection apparatus.

7 Claims, 6 Drawing Sheets

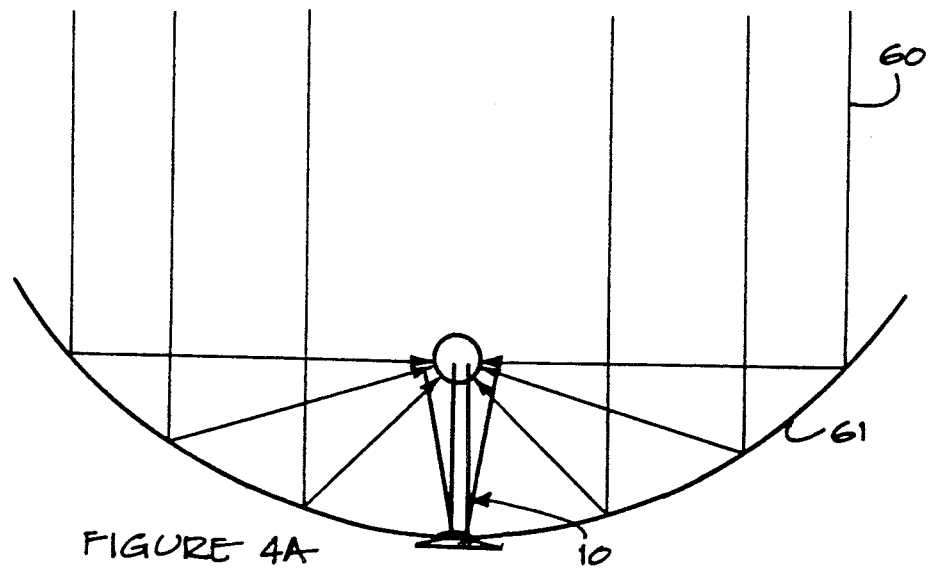
FIGURE 4A
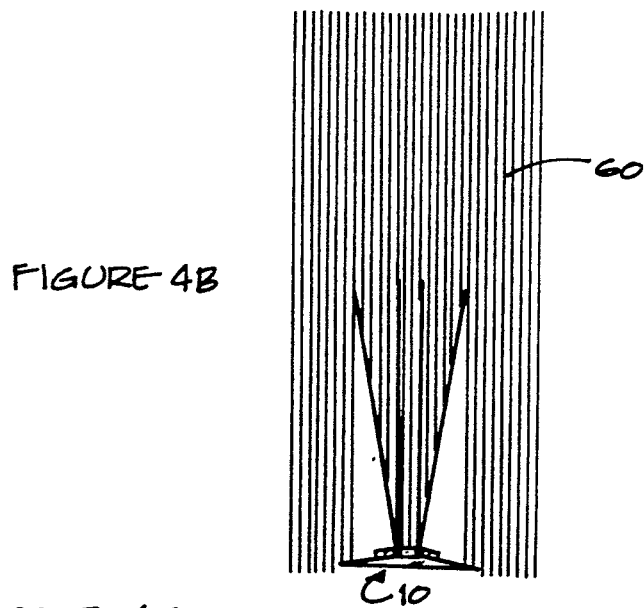
FIGURE 4B
FIGURE 4C
MAINTAINING CONSTANT SPEED OF MOTOR
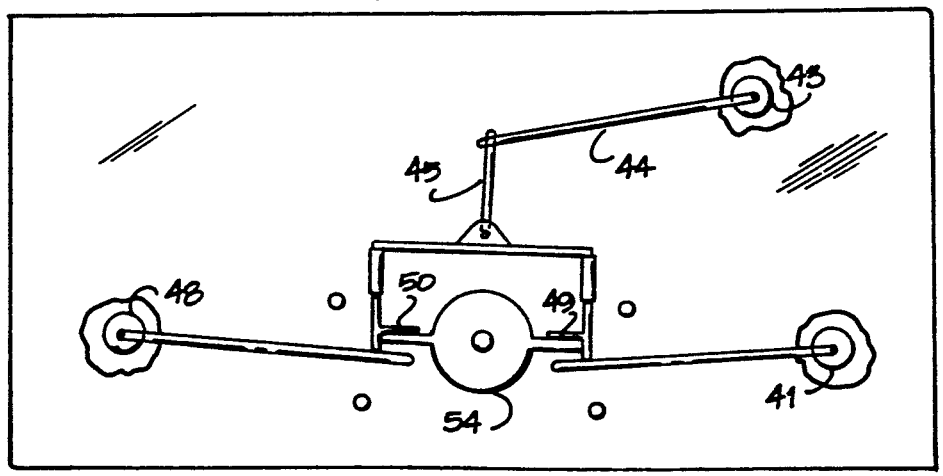

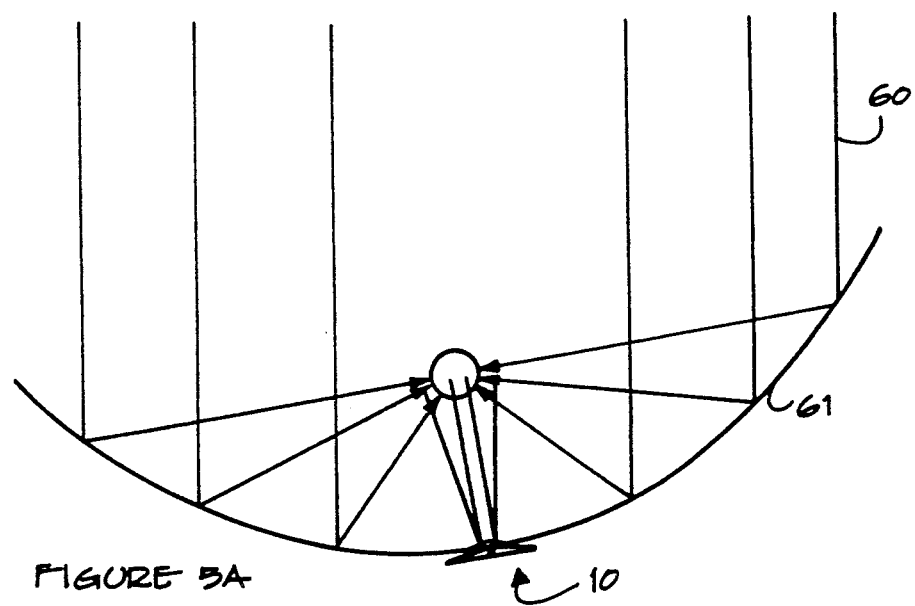
FIGURE 5A
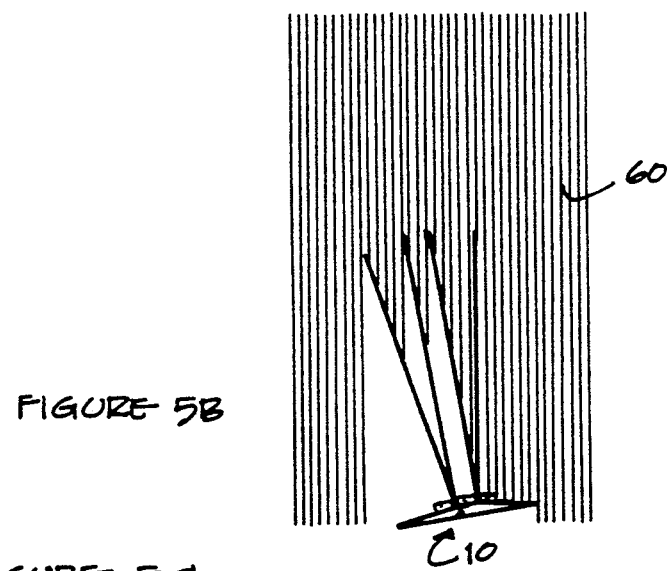
FIGURE 5B
FIGURE 5C
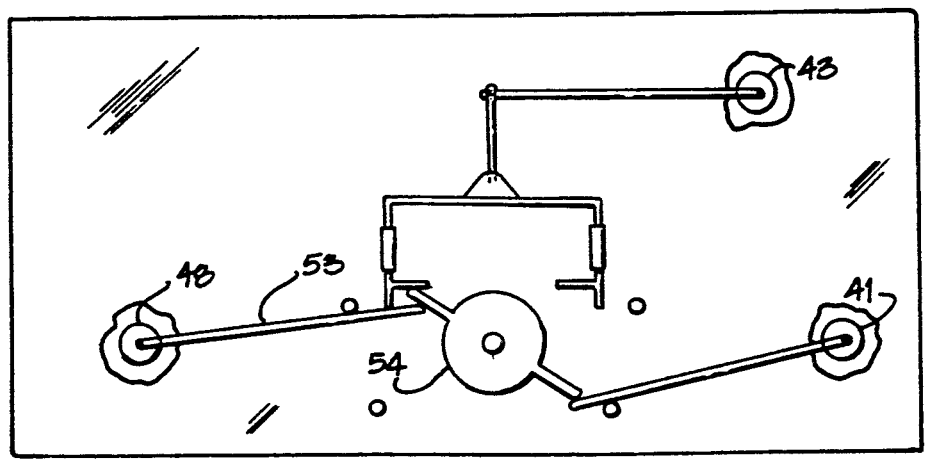
INCREASING SPEED OF MOTOR

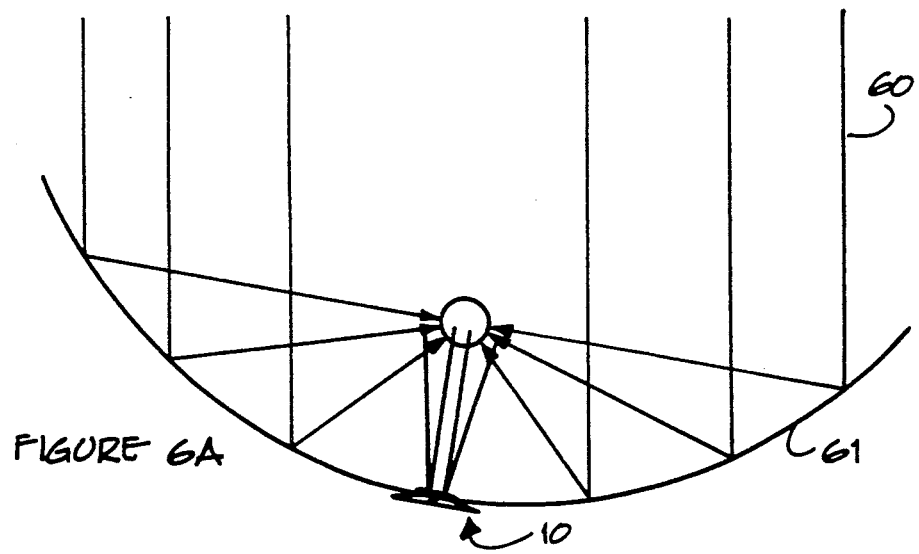
FIGURE 6A
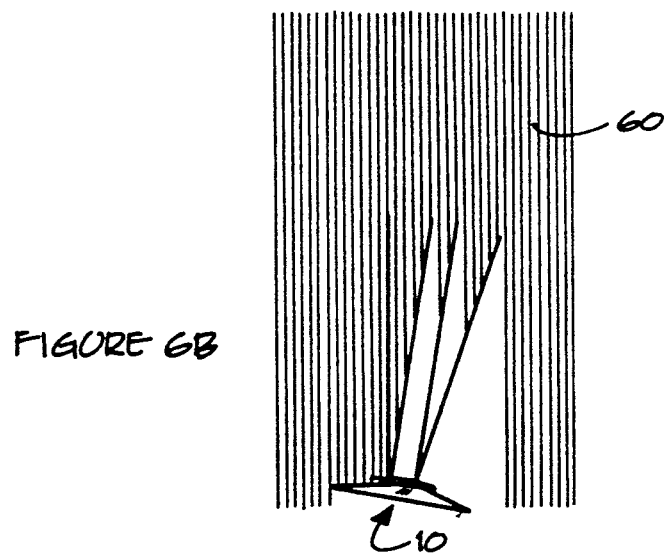
FIGURE 6B
FIGURE 6C
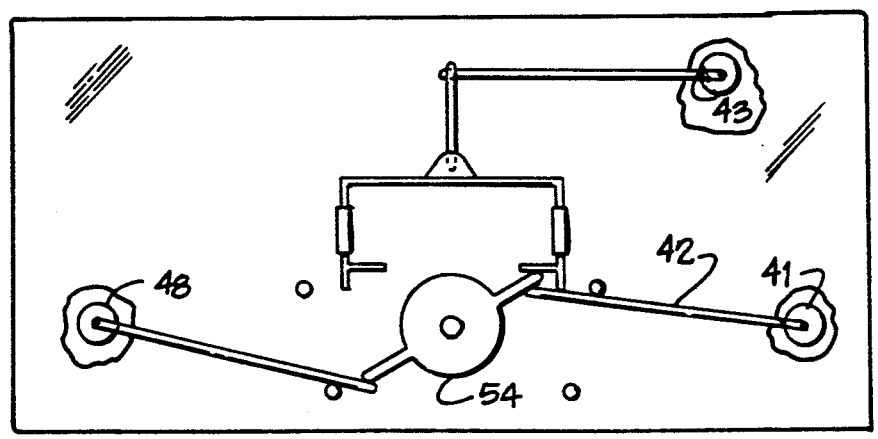
DECREASING SPEED OF MOTOR

SOLAR TRACKING DEVICE HAVING THREE SENSORS SEPARATED BY FOUR SEMICIRCULAR VANES

BACKGROUND OF THE INVENTION

The present invention relates to solar tracking devices, particularly the type utilizing photoelectric sensors to detect solar radiation, and electrical circuits to transfer electrical signals to motors which are the controlling means to adjust the speed of a main drive motor which rotates a solar energy collection device.

It is well known that to achieve optimal performance in a solar energy collecting device, the device must receive the maximum amount of solar flux available. During periods of overcast conditions, the object of greatest solar flux emittance may be a cloud reflecting solar radiation. Under such conditions, the solar energy collecting device should be in a position to receive the greatest amount of solar flux, even if such positioning would result in non-alignment with the obscured sun. When the cloudy period ends, the solar energy collection device should realign with the sun with a minimal loss of time.

Prior art disclosures have inherent complexities and inefficiencies:

1). Most prior art using multiple photoelectric sensors requires the precise balancing of the sensors to complete or form an electrical circuit. The circuit becomes inoperable if the sensors become unbalanced. This requires frequent adjustment of the sensors to maintain the required balance, which is both costly and demands an advanced knowledge of the equipment used in balancing the sensors.

2). Prior art using photoelectric sensors lacks the ability to track the source of highest solar flux emittance during periods of overcast conditions, which is a requirement for optimal efficiency.

3). Prior art using photoelectric sensors employs the sensors as a controlling means to turn the main drive motor for the solar energy collecting apparatus on or off. As is known, this causes acceleration and jerk in the drive mechanism which results in unnecessary stress which may lead to failure of the mechanism. Also, the constant on or off switching to the motor will result in excessive wear on the motor.

4). Prior art not using photoelectric sensors requires either a clock driven system or an extremely complex and expensive computer algorithm; neither of which will track the source of highest solar flux emittance, and either of which will become misaligned upon receiving a physical disturbance.

Accordingly, an object of the invention is to improve the efficiency of solar tracking systems by enabling the system to track the source of highest solar flux emittance during periods of overcast conditions, while causing the system to rapidly reacquire the sun when overcast conditions cease.

A further object of the invention is to enhance the dependability of solar tracking systems by utilizing circuitry which is not dependent upon precise balancing of multiple photoelectric sensors.

A still further object of the invention is to improve the reliability of solar tracking systems by avoiding the stresses caused by frequent on and off switching of the main drive motor.

Yet another object of the invention is to simplify solar tracking systems by avoiding the need for clock-driven or computer algorithm driven tracking devices.

Still another object of the invention is to provide a solar tracking system which is economical to produce and which is serviceable by the end user.

SUMMARY OF THE INVENTION

In order to overcome the disadvantages of prior art solar tracking devices, the present invention utilizes three photoelectric sensors separated by semicircular vanes which are arranged so as to produce a shadow line over any two of the photoelectric sensors at any given time. Each resistive photoelectric sensor is a component of a separate electrical circuit. Each electrical circuit acts as a switching device to supply electrical current to a small motor which is dedicated to that particular circuit. Having separate electrical circuits for each photoelectric sensor eliminates the need to balance the photoelectric sensors. The resistivity of the photoelectric sensor not covered by the shadow of one of the semicircular vanes is decreased, resulting in increased current to the small motor connected to that sensor's electrical circuit.

The small motors are mounted on a plate and each provides a means to rotate a linkage; each linkage being used to rotate a uniquely designed knob either clockwise, counterclockwise, or to return the knob to a preset position. The knob is also attached to the aforementioned plate in a manner which allows free rotation of the knob. The plate is mounted to a fixture containing a rheostat. The knob is affixed to the shaft of this rheostat. The purpose of the rheostat is to control the electrical current to the main drive motor; and, since the speed of the main drive motor is directly proportional to the amount of electrical current being supplied to the motor, adjustment of the rheostat adjust the speed of the main drive motor.

The adjustability of the speed of the main drive motor eliminates the need for a continuous on/off cycle of the motor. Providing for adjustability of the speed of the main drive motor allows the solar energy collecting apparatus to be physically displaced and still retain optimal efficiency without any adjustments to the solar tracking device. Also, with the main drive motor continuously operating, the solar energy collecting device will be maintained in the optimal position to receive solar flux from the source of greatest emittance.

BRIEF DESCRIPTION OF THE DRAWINGS

FIGS. 4A, 4B, 4C are overall view of the circumstances resulting maintenance of the speed of the main drive motor.

FIG. 4A is a side view of a parabolic solar energy collector with the vanes and photoelectric sensors attached. The parabolic collector is shown in the correct position to achieve optimal performance from the incident solar radiation.

FIG. 4B is a front view of the vanes and photoelectric sensors of FIG. 4A receiving solar radiation.

FIG. 4C is a front view of the control mechanism with one of the motors activated as a result of the photoelectric sensor of FIG. 4B receiving incident solar radiation.

FIGS. 5A, 5B, 5C are overall view of the circumstances resulting in an increase of the speed of the main drive motor.

FIG. 5A is a side view of a parabolic solar energy collector with the vanes and photoelectric sensors attached. The parabolic collector is shown in a position in which the speed of rotation is too slow to achieve optimal performance from the incident solar radiation.

FIG. 5B is a front view of the vanes and photoelectric sensors of FIG. 5A receiving solar radiation.

FIG. 5C is a front view of the control mechanism with one of the motors activated as a result of the photoelectric sensor of FIG. 5B receiving incident solar radiation.

FIGS. 6A, 6B, 6C are overall view of the circumstances resulting in a decrease of the speed of the main drive motor.

FIG. 6A is a side view of a parabolic solar collector with the vanes and photoelectric sensors attached. The parabolic collector is shown in a position in which the speed of rotation is too fast to achieve optimal performance from the incident solar radiation.

FIG. 6B is a front view of the vanes and photoelectric sensors of FIG. 6A receiving solar radiation.

FIG. 6C is a front view of the control mechanism with one of the motors activated as a result of the photoelectric sensor of FIG. 6B receiving incident solar radiation.

DESCRIPTION OF THE PREFERRED EMBODIMENT

Figure 1A:
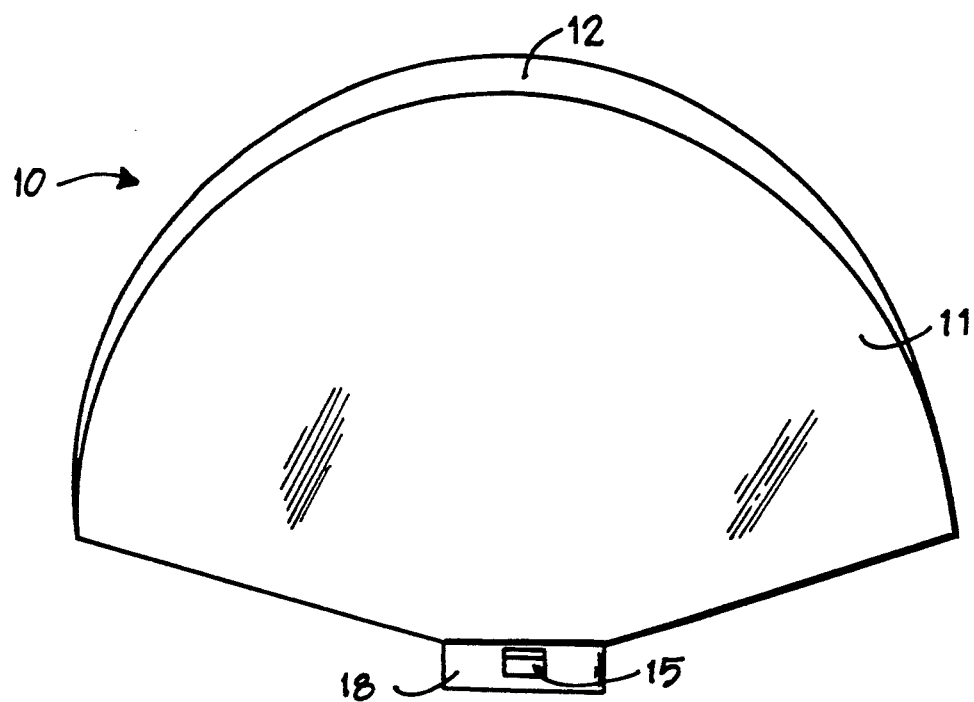
FIG. 1A is a side view of the semicircular vanes and photoelectric sensors of a preferred solar tracking system.
Figure 1B:
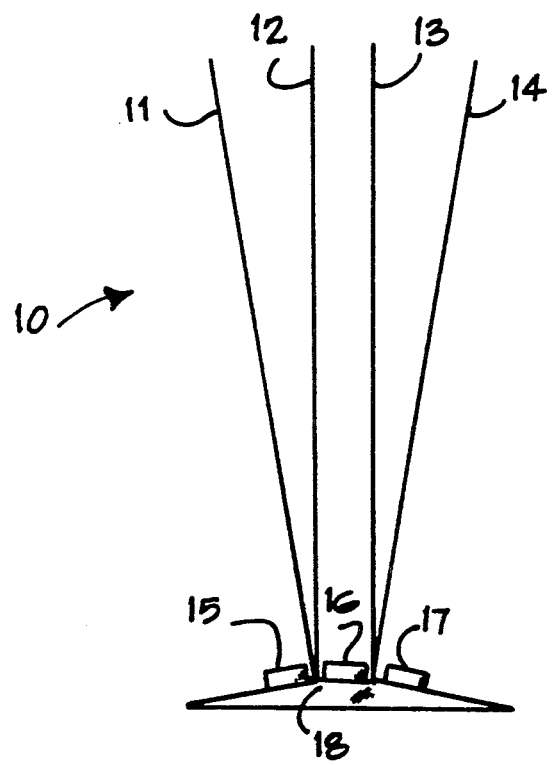
FIG. 1B is the front view of the semicircular vanes and photoelectric sensors of a preferred solar tracking system.
Figure 2:
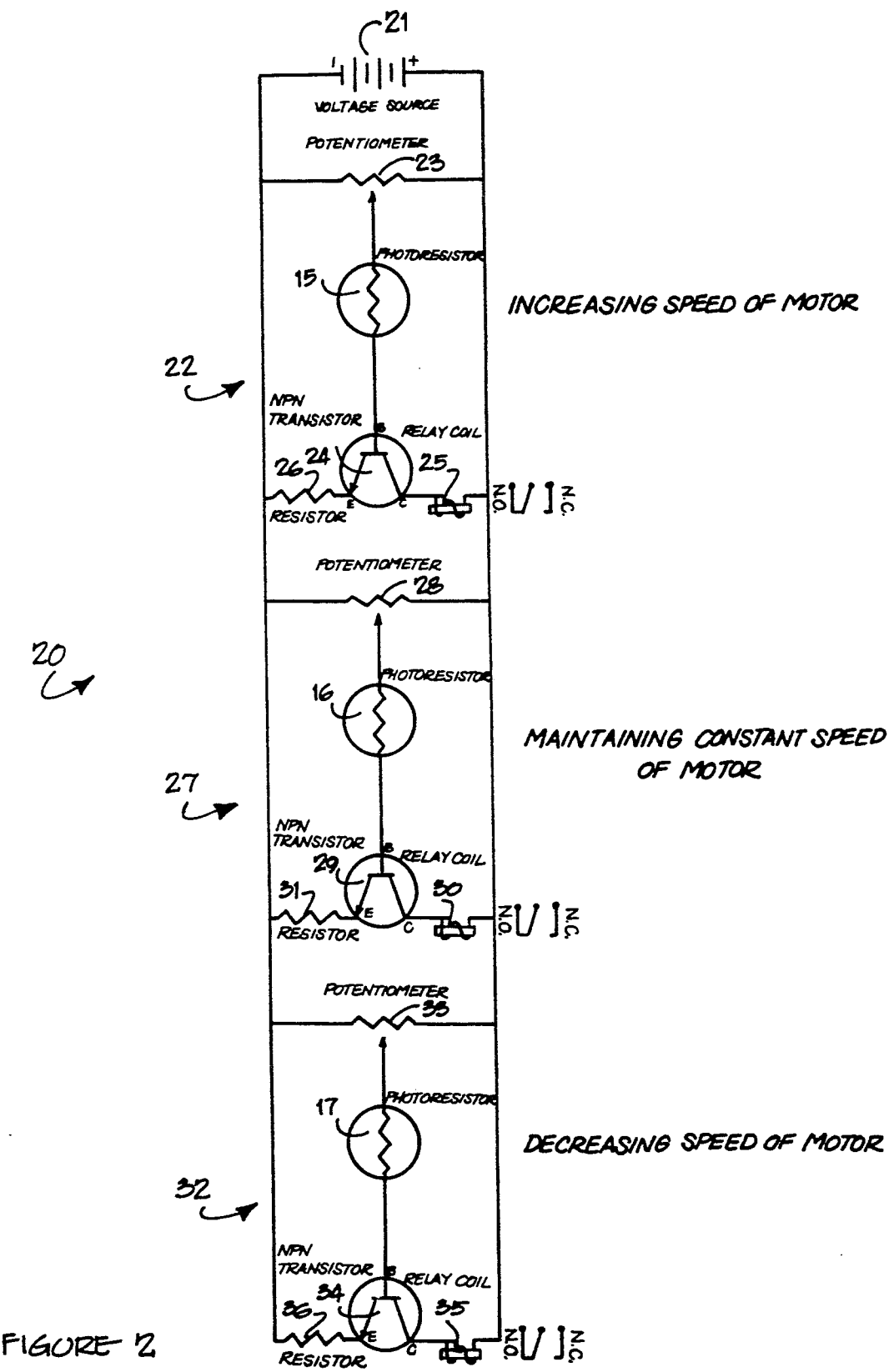
FIG. 2 is a schematic drawing of the three electrical circuits connected in parallel.
Figure 3A:
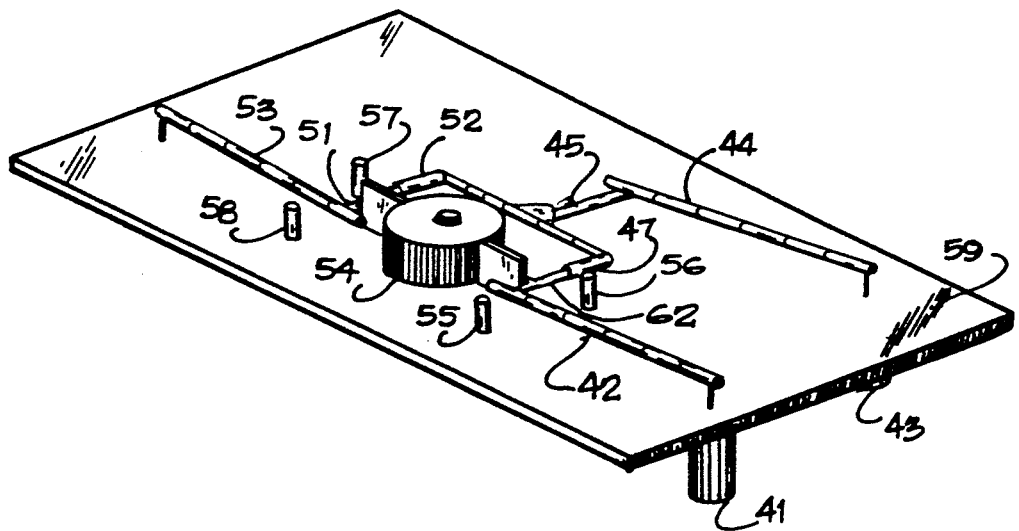
FIG. 3A is a perspective view of the control mechanism of a preferred solar tracking system which adjusts the speed of the main drive motor.
Figure 3B:
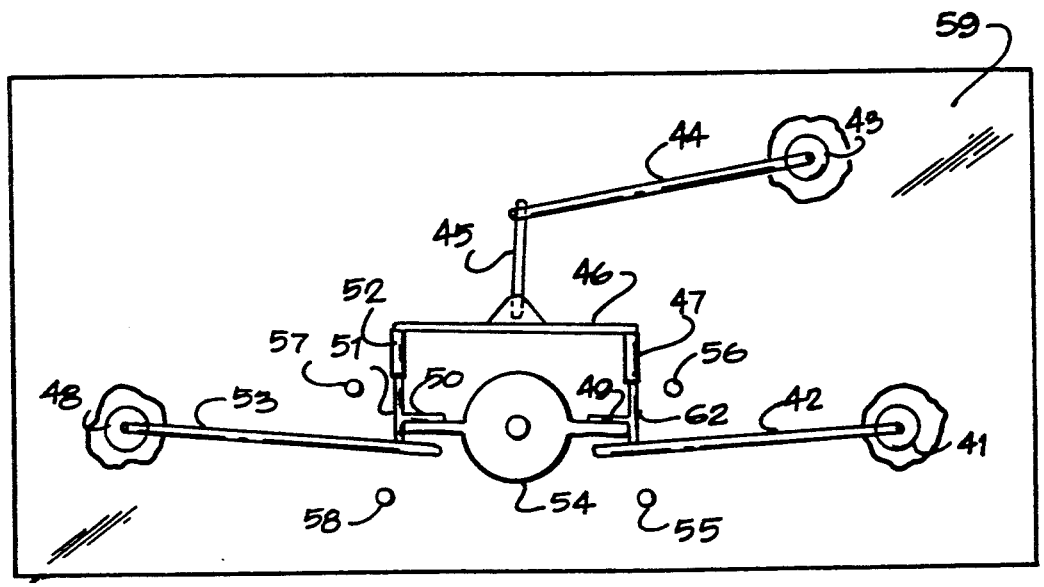
FIG. 3B is a front view of the control mechanism of a preferred solar tracking system which adjusts the speed of the main drive motor.

The preferred embodiment of the present invention is comprised of a photoelectric sensor assembly 10, shown in FIG. 1A and 1B, a parallel combination of electrical circuits 20, shown in FIG. 2, and a controlling mechanism assembly 40, shown in FIGS. 3A and 3B.

As shown in FIG. 1A and FIG. 1B, the photoelectric sensor assembly consists of 4 semicircular vanes 11, 12, 13, 14 separating three dark resistive photoelectric sensors 15, 16, 17, with all vanes and sensors being mounted on a block 18. The semicircular shape of vanes 11, 12, 13, 14 allows for the seasonal variation of the path of solar radiation and also allows the photoelectric sensor assembly 10 to be mounted axially on either end of a solar collecting device.

In FIG. 2, the parallel combination of electrical circuits 20 consists of a DC power source 21 which delivers DC power to the three electrical circuits 22, 27, 32. Each electrical circuit 22, 27, 32 is comprised of a potentiometer 23, 28, 33, a dark resistive photoelectric sensor 15, 16, 17, an NPN transistor 24, 29, 34, a relay coil 25, 30, 35, and a resistor 26, 31, 36. The potentiometers 23, 28, 33 are used to adjust the sensitivity of the photoelectric sensors 15, 16, 17, respectively, to a predetermined sensitivity. The predetermined sensitivity should be less than that required for the solar tracking device to become activated by reflected radiation from the moon. This sensitivity level will allow the solar tracking device to track any object which has an emittance or reflectance of solar radiation greater than that possible from the moon. Each of three electrical circuits 22, 27, 32 is well known to be commonly found in households as an automatic night light; yet, when placed in parallel and combined with the other components described herein, the combination of the electrical circuits becomes a simple means of adjusting the speed of a motor using incident solar radiation.

The principle which governs the operation of each electrical circuit is: upon solar radiation impinging on photoelectric sensor 15, 16, or 17, its resistance is lowered and electrical current passes through the photoelectric sensor 15, 16, or 17 rather than the potentiometer 23, 28, or 33 and continues to the base of an NPN transistor 24, 29, or 34. The electrical circuit is then completed with electrical current passing through relay coil 25, 30 or 35. The switch contained in the relay coil 25, 30, or 35 is closed allowing electrical current from another source to activate motor 41, 43 or 48 of FIG. 3.

FIG. 3 depicts the controlling mechanism assembly 40 which consists of three small reversible DC motors 41, 43, 48, linkages 42, 44, 45, 46, 49, 50, 51, 53, 62, sleeves 47, 52 to guide linkages 62, 51 respectively, a uniquely designed control knob 54 which is attached over the shaft of an existing rheostat, and pins 55, 56, 57, 58 to limit the movement of linkages 42, 53; with all the aforementioned components of controlling mechanism assembly 40 being mounted on plate 59.

FIG. 4 depicts the association between the photoelectric sensor assembly 10 and the controlling mechanism 40 when the solar energy collecting apparatus is properly oriented for optimal performance. Referring now to FIG. 4A, an end view of a parabolic solar collector 61 may be seen receiving solar radiation 60 and having the photoelectric sensor assembly 10 mounted axially. FIG. 4B presents a view of the photoelectric sensor assembly 10 receiving solar radiation 60. It may be seen in FIG. 4B that the outermost vanes 11, 14 provide shading for the two outermost photoelectric sensors 15, 17. The center photoelectric sensor 16 receives the solar radiation 60 resulting in the activation of the small DC motor 43. As seen in FIG. 4C, motor 43 rotates counterclockwise with linkage 44 affixed. Linkage 44 is pinned to linkage 45 and forces linkage 45 to move toward the control knob 54. Linkages 46, 62, 49, 50, and 51 are affixed to each other in a configuration to resemble that presented in FIG. 3B with linkages 62, 51 moving through stationary sleeves 47, 52 respectively. By way of the given configuration, linkage 45 forces linkages 49 and 50 down onto the control knob 54 which acts to keep the rheostat at a predetermined setting. The aforementioned operation maintains the speed of rotation of the main drive motor.

FIG. 5 depicts the association between the photoelectric sensor assembly 10 and the controlling mechanism 40 when the solar energy collecting apparatus is lagging behind its proper orientation for optimal performance. Referring now to FIG. 5A, an end view of a parabolic solar collector 61 may be seen receiving solar radiation 60 and having the photoelectric sensor assembly 10 mounted axially. FIG. 5B presents a view of the photoelectric sensor assembly 10 receiving solar radiation 60. It may be seen in FIG. 5B that the outermost vane 11 provides shading for the outermost photoelectric sensor 15 and a center vane 13 provides shading for photoelectric sensor 16. The rightmost photoelectric sensor 17 receives the solar radiation 60 resulting in the activation of the small DC motor 48. As seen in FIG. 5C, motor 48 rotates counterclockwise with linkage 53 affixed. Linkage 53 then rotates the control knob 54 in a clockwise direction which increases the speed of the main drive motor. When the solar energy collection apparatus is in a position for optimal performance, photoelectric sensor 16 will receive the incident solar radiation thereby returning the speed of the main drive motor to its predetermined normal operating speed.

FIG. 6 depicts the association between the photoelectric sensor assembly 10 and the controlling mechanism 40 when the solar energy collecting apparatus is ahead of its proper orientation for optimal performance. Referring now to FIG. 6A, an end view of a parabolic solar collector 61 may be seen receiving solar radiation 60 and having the photoelectric sensor assembly 10 mounted axially. FIG. 6B presents a view of the photoelectric sensor assembly 10 receiving solar radiation 60. It may be seen in FIG. 6B that the outermost vane 14 provides shading for the outermost photoelectric sensor 17 and a center vane 12 provides shading for photoelectric sensor 16. The leftmost photoelectric sensor 15 receives the solar radiation 60 and activates the small DC motor 41. As seen in FIG. 6C, motor 41 rotates clockwise with linkage 42 affixed. Linkage 42 then rotates the control knob 54 in a counterclockwise direction which decreases the speed of the main drive motor. When the solar energy collection apparatus is in a position for optimal performance, photoelectric sensor 16 will receive the incident solar radiation thereby returning the speed of the main drive motor to its predetermined normal operating speed.

Having disclosed the subject matter of this invention, it should be obvious that many substitutions, variations, and modifications of this device are possible in light of the above teachings. It is therefore intended that all matter contained in the accompanying specification shall be interpreted as illustrative only, and not in a limiting sense. The invention as described should only be limited by the breadth and scope of the appended claims.

What I claim is:

1. A solar tracking device for use in conjunction with a solar energy collection apparatus, said tracking device comprising;
    a photoelectric sensor assembly having four vanes separating three photoelectric sensors, with said vanes and photoelectric sensors being mounted upon a common surface in a manner which allows only one of said photoelectric sensors to be illuminated by the source of the greatest amount of solar flux at any given moment in time,
    a parallel combination of three electric circuits, whereby the passage of electric current through said electric circuits is governed by the amount of solar radiation impacting said photoelectric sensors, and
    means for converting said electric current into mechanical control of a rheostat which controls the movement of a solar energy collection apparatus.

2. A solar tracking device according to claim 1, wherein said means for converting said electric current comprises;
    three small reversible DC motors, the activation of each of said DC motors being controlled by one of said electric circuits,
    a control knob attached to a rheostat which controls the movement of a solar energy collection apparatus, and
    means for mechanically connecting said DC motors to said control knob whereby said control knob is turned clockwise, counterclockwise, or returned to a predetermined position depending upon which of said DC motors is activated.

3. A solar tracking device according to claim 2, wherein said means for mechanically connecting said DC motors to said control knob comprises;
    a linkage member fixably connected at one end to the axis of rotation of each of the said DC motors responsible for causing clockwise or counterclockwise rotation of said control knob whereby rotation of said DC motors causes the other end of said linkage member to impact upon a protruding fin of said control knob causing clockwise or counterclockwise rotation of said control knob, and
    a linkage member fixably connected at one end to the axis of rotation of the said DC motor responsible for returning said control knob to a predetermined position, said linkage member being rotatably connected at its other end to another linkage member which in turn is rotatably connected to a U-shaped linkage member whereby rotation of said DC motor causes the two ends of the said U-shaped linkage member to impact opposing protruding fins of said control knob causing said control knob to return to a predetermined position.

4. A solar tracking device according to claim 1, wherein said vanes are semicircular in shape.

5. A solar tracking device according to claim 1, wherein said vanes and said photoelectric sensors are arranged such that two each of said vanes are connected to said common surface at the two points between the three said photoelectric sensors with the center two said vanes being parallel to each other and perpendicular to the surface of said center photoelectric sensor, and the outer two said vanes being connected in an angular fashion sufficient to cast a shadow on the outer two said photoelectric sensors when the source of solar radiation is perpendicular to the surface of said center photoelectric sensor.

6. A solar tracking device according to claim 1, wherein said photoelectric sensors are of the cadmium sulfide variety.

7. A solar tracking device according to claim 1, wherein each of said electric circuits further comprise;
    a potentiometer, whereby the sensitivity of said photoelectric sensors can be adjusted,
    a relay coil, whereby a switching device may be controlled in an on-off fashion,
    a NPN transistor, whereby electric current is allowed to flow through said relay coil when electric current passes through said photoelectric sensors to said NPN transistor, and
    a resistor, whereby the resistance of the potentiometer is offset.

\* \* \* \* \*